Oct. 28, 1958  G. SADOIAN ET AL  2,858,034
BOX LOADER HITCH
Filed March 15, 1957  2 Sheets-Sheet 2
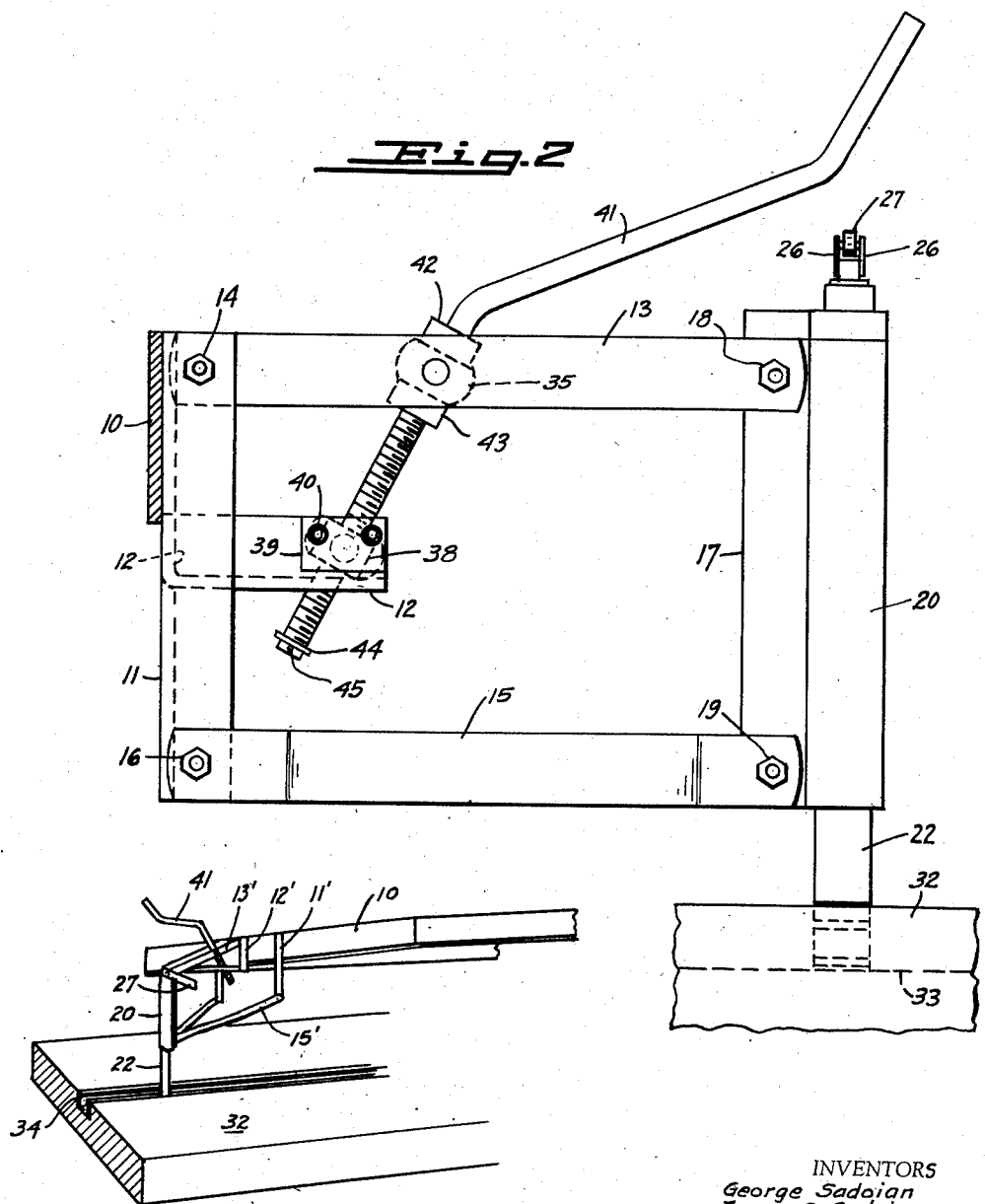
INVENTORS
George Sadoian
Zaven G. Sadoian
Antranig V. Sadoian
BY
ATTORNEY

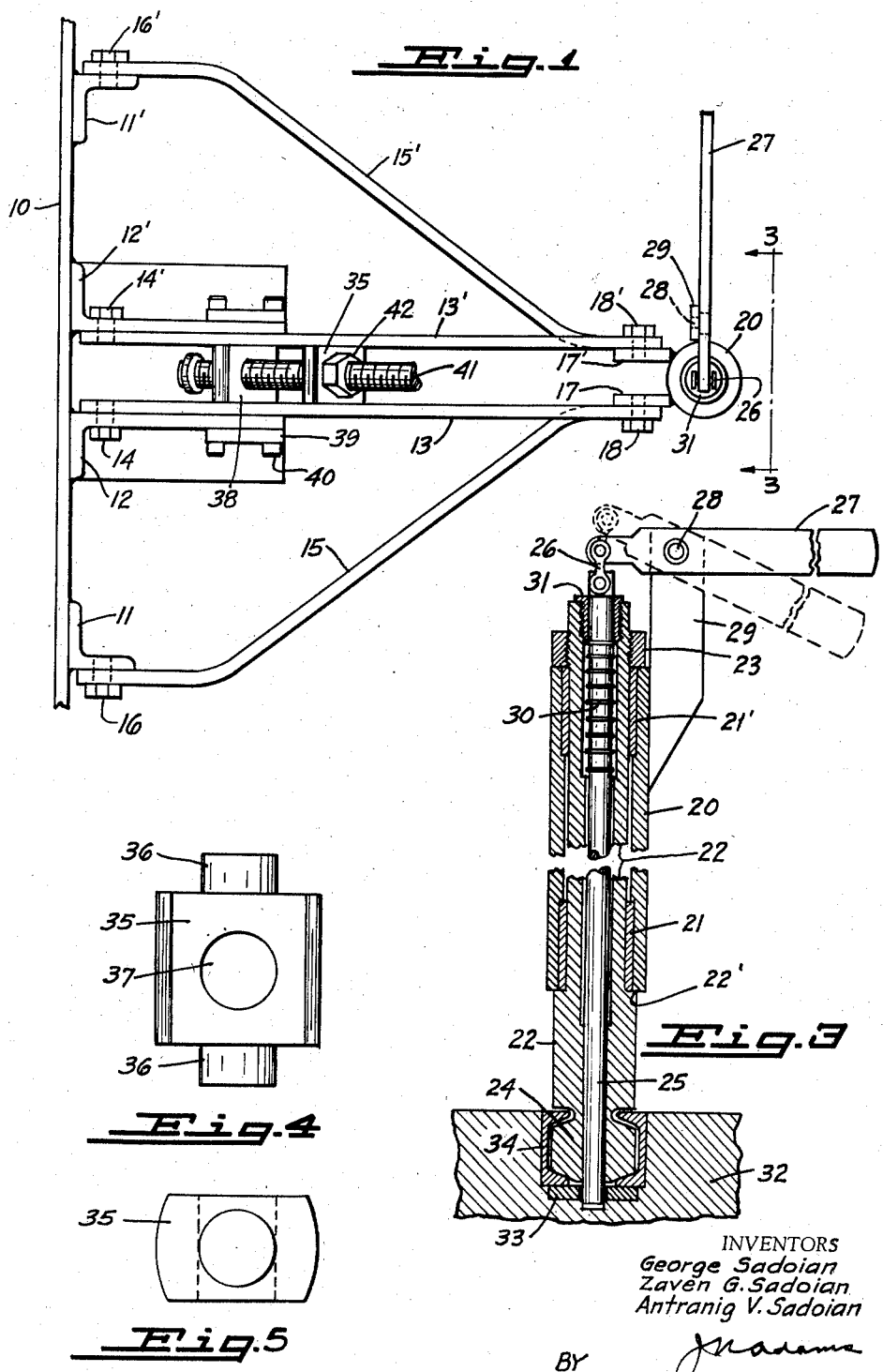

United States Patent Office 2,858,034
Patented Oct. 28, 1958

2,858,034

BOX LOADER HITCH

George Sadoian and Zaven G. Sadoian, Dinuba, and Antranig V. Sadoian, Orosi, Calif.

Application March 15, 1957, Serial No. 646,435

6 Claims. (Cl. 214—77)

This invention relates to apparatus for connecting or hitching to a truck to be driven about over a field and there loaded with boxes of fruit or vegetables and the like, a loader for elevating and conveying said boxes to or above the level of the truck bed.

In areas where fruit and vegetables and such crops are grown on a large scale considerable labor is saved in gathering from over the field the boxes of the harvested crop through the use of a loading device which is hitched to the truck and which has an endless chain or conveyor belt, driven by a gasoline engine or other suitable power unit carried by the loader, the said chain or belt traveling on a slope from near the ground to above the truck bed. The moving chain is provided with suitable lugs for holding the boxes so that when workmen place the boxes on the conveyor at the foot of the slope they are conveyed to a level above the truck bed, at which point the boxes are delivered on to an extension which is an integral part of the loader and which conveys the boxes by gravity, as over a series of rollers or other suitable gravity conveyor section, to desired positions over and at a level above the truck bed where workmen receive them and place them in loaded position on the truck. In the use of such a loader it is desirable that at the beginning of the loading operation the boxes be conveyed to the forward end of the truck bed and that as the loading progresses the delivering end of the loader be moved rearwardly at the convenience of the loading operators. Trucks of varying size and height may be employed in gathering the boxes and this makes it necessary that provision be made for raising or lowering the delivering end of the gravity section of the conveyor so that for varying heights of trucks this gravity section of the conveyor will have a desired downward gradient toward the truck bed. Furthermore, as the truck is driven about over curved routes in the field it is desirable that the loader remain hitched to the truck for any and all positions of the delivery end of the loader whether such position be at the forward or rearward end of the truck bed or at intermediate points therebetween.

It is a primary object of this invention to provide an apparatus for hitching a loader of the type above described to the bed of a truck, by which hitching apparatus (1) the delivering end of the loader can be connected to the truck bed at different selected points ranging from the forward to the rearward end of the truck bed as the loading of the boxes on to the truck progresses; (2) the delivering end of the gravity conveyor section of the loader can be raised or lowered to provide a proper gradient for such gravity conveyor section with trucks of varying heights; and (3) the said hitching apparatus comprises the sole connection of the trailing loader to the truck for all points between the forward and rearward end of the truck bed at which the delivering end of the loader is hitched to the truck bed.

These and other objects and advantages of the invention will appear from the ensuing description and the appended claims.

One form of the invention is illustrated by way of example in the accompanying drawings and is described in detail hereinafter. The particular constructions herein shown and described are to be construed as illustrative only, and not as limiting the invention.

In the drawings:

Fig. 1 is a top plan view of that part of our hitch mechanism which is permanently attached to the loader, a fragment of the forward end plate of the loader to which the mechanism is attached, is also shown.

Fig. 2 is a side elevation view of the mechanism shown in Fig. 1, together with a fragment of the truck bed and track with which the mechanism coacts.

Fig. 3 is an end elevation view, enlarged and partly in section, of the mechanism as seen in the direction of line 3—3 of Fig. 1.

Fig. 4 is a top plan view of one of the pivot blocks in which the crank rod used in the mechanism turns.

Fig. 5 is a side elevation of the pivot block shown in Fig. 4.

Fig. 6 is a fragmentary perspective view showing the hitch mechanism in its relation to the forward end of the loader and the track in the truck bed with which the mechanism coacts.

Referring to the drawings, to a vertical face plate 10 positioned at the forward end of the loader (Fig. 6 and Figs. 1 and 2) there are welded or otherwise suitably secured thereto two vertical angle bars 11 and 11' one on each side of the longitudinal center line of the loader, which extend downwardly from the lower edge of said face plate a distance which may vary as desired, from six to eight inches or thereabouts being convenient in most instances for said distance. Similarly secured to said face plate of the loader are two other angle bars 12 and 12' positioned vertically on said face plate, one on each side of the said center line of the loader a considerably shorter distance apart than angle bars 11 and 11'. Each angle bar 12 and 12' is bent so as to extend horizontally forward from a point intermediate the upper end of bars 12 and 12' and the lower end of bars 11 and 11', preferably near the mid point therebetween as seen best in Fig. 2. The forwardly extending portions of angle bars 12 and 12' serve as a bracket to receive the pivotal anchorage for a crank rod, later to be explained for raising and lowering the forward end of the loader. In lieu of said forwardly extending portions of said angle bars suitable web plates may be welded or otherwise secured to face plate 10 so as to extend forwardly therefrom, or other suitable bracket structure as desired may be employed for said anchorage purpose. Bars 13 and 13' are connected at one end to the upper end of angle bars 12 and 12' respectively so as to swing up and down in a vertical plane. Bolts 14 and 14' positioned in suitable holes drilled horizontally through angle bars 12 and 12' and bars 13 and 13', or other suitable means may be employed to serve as the horizontal axes on which bars 13 and 13' may swing. A pair of bent bars 15 and 15' are similarly hingedly connected to the lower ends of angle bars 11 and 11' as by bolts 16 and 16'. The bars 15 and 15' are bent (as shown in Fig. 1) so that their forward ends may be positioned approximately directly below the forward ends respectively of bars 13 and 13'. The forward ends of bars 13 and 15 and 13' and 15' are respectively hingedly connected to a pair of vertical bars 17 and 17', as by bolts 18 and 18' and bolts 19 and 19' at the upper and lower ends respectively of bars 17 and 17'. The distance between the hinged connections at 18 and 19 is the same as that between 14 and 16; and correspondingly the distances between 18' and 19' and between 14' and 16' are equal. It will thus be seen that the bars 13 and 15 constitute the two opposite sides of a parallelogram frame structure, that bar 17 constitutes the outer end of said parallelogram, and that the opposite end of the parallelogram lies in the structure formed by angle bars 11 and 12 and face plate 10; also that a counterpart to this parallelogram is formed by bars 13′ and 15′, bar 17′ and the combination of angle bars 11′ and 12′ together with face plate 10; that each of the outer arms 17 and 17′ of the two parallelogram frame structures is movable with respect to its opposite arm which lies in the face plate 10 and the angle arm bars secured thereto; and that when arms 17 and 17′ are thus moved they remain vertical. It will also be seen that if the outer arms 17 and 17′ were fixedly secured to each other (so that the arms 17 and 17′ were in effect one single piece) the pair of parallelograms would in effect constitute a single parallelogram structure the forward end of which would be movable and always vertical (or parallel to the face plate 10 of the loader); also, conversely, that if the forward end of such parallelogram structure is held stationary with respect to vertical movements, as for example with respect to a truck bed being loaded, the face plate of the loader and hence the end of the loader to which it is attached are movable upwardly or downwardly.

The relationship of the forward ends 17 and 17′ of the aforesaid parallelogram structures to the truck bed will next be described. The two members 17 and 17′ are welded at their forward edges to a single pipe or tubular member 20 which desirably though not necessarily is approximately the same length as said bars 17 and 17′ so that its ends are flush with the ends of said bars. Through this means the aforesaid pair of parallelograms are constituted as a single parallelogram structure. Each end of tube 20 is reamed and fitted with bushings 21 and 21′. A hollow strut member 22 extends throughout the length of the pipe 20 and is adapted to turn in said bushings, the lower portion of said strut being of enlarged diameter so as to provide a shoulder 22′ against which the lower end of pipe 20 rests, a suitable collar 23 threadedly engaged to the upper end of strut member 22 contacts the upper end of pipe 20 and in coaction with the shoulder 22′ at the upper end of enlarged portion of strut 22 holds strut 22 in fixed engagement to pipe 20. The lower end portion of strut 22 terminates in a knob portion 24 which is adapted to be movable back and forth in a track installed in a truck bed and later to be described. A rod 25 extends throughout the length of the hollow strut member 22 and protrudes beyond each end thereof, the upper end of said rod being connected by links 26 to the end of a hand operated lever 27 fulcrummed at 28 to a bracket 29 suitably positioned in fixed attachment, as by welding, to the upper portion of pipe 20 whereby, through the movement of said lever the said rod 25 may be moved up and down and its lower end brought into engagement and disengagement with appropriate holes or notches in the aforesaid track installed in a truck bed as more fully hereinafter explained. A coiled spring 30 is positioned around the upper end of rod 25 (the strut 22 being appropriately reamed to provide room for the spring), and has its lower end secured to said rod by any suitable means such as the end strand of said spring being inserted into a hole appropriately drilled in said rod. A hollow cap member 31 positioned around rod 25 and threadedly engaged in the upper end of strut 22 provides a purchase for the upper end of the said spring whereby the latter exerts a continuously downward force on the rod 25.

As stated herein above, the knob 24 on the lower end of strut member 22, and the lower end of the rod 25 which is movable up and down in strut member 22, are adapted for coaction with a track positioned in the bed of a truck which is to be loaded during operation of the loader and behind which the loader trails as the truck is moved over the terrain. Such a track is preferably located along the longitudinal center line of the truck 32 (Fig. 6) and may extend approximately the full length of said bed and with its upper edge preferably flush with the surface of the bed so that it offers no obstruction to the movement of loaded boxes over the surface of the bed. The said track may consist of a narrow metal strip 33 (Fig. 3) in the bottom of an appropriate groove extending lengthwise in the upper surface of the truck bed to which are welded or otherwise suitably secured thereto a pair of channel bars 34 with their channelled portions facing each other and spaced apart to provide easily slidable engagement therewith of said knob 24. Desirably, though not necessarily, the lower surface of said knob may conform to the upper surfaces of the adjacent lower flanges of said channel bars so that said knob may rest thereon at all times while in slidable engagement with said track. Alternatively, the knob 24 may be adapted to rest upon the plate or strip 33, the channels 34 being appropriately spaced therefor. At appropriate intervals along its longitudinal center line the plate or strip 33 is drilled with holes (not shown) or appropriate notches therein provided, as desired, for easily slidable engagement of the lower end of rod 25 in any of said holes or notches, the aforesaid spring 30 keeping said rod 25 in such engagement until, through operation of said hand lever 27 the rod is disengaged from said hole or notch. It will thus be seen that there is provided means for selectively fixed engagement of the rod 25, and correspondingly of the strut member 22, with said track in the truck bed for various desired positions along the track between the forward and rearward ends of the truck bed and that therefore the forward end of the loader may, as desired, be brought to the vicinity of the forward end of the truck at the beginning of the loading operation and then, as the loading of the truck progresses, moved at desired intervals to selected points toward the rear of the truck bed and the loader latched at the various selected points, the different positions to which the loader is thus moved and latched depending on such factors as size of boxes being loaded, the type of the load, etc.

As was pointed out at the beginning of this specification, trucks used for hauling boxes in the field are generally of different heights; also that the loader is generally constructed so that after the boxes are elevated by a power driven conveyor section from the ground to a level above the truck bed they are thence carried by a gravity conveyor section of the loader forwardly over the truck bed, the forward end of the loader which contains the gravity conveyor section generally extending in a somewhat horizontal direction over and above the truck bed, and the said gravity conveyor section being in fixed engagement with the elevator section and otherwise an integral part of the loader. In order to assure that the gravity conveyor section of the loader will slope downwardly, and at a desirable gradient, toward the truck bed for trucks of varying heights, the said parallelogram structure is provided and the strut member 22 mounted thereto so as to form a part of the forward vertical side of said parallelogram. With this structure there is provided means whereby, when the loader is hitched to trucks of varying heights, the face plate 10 and the forward end of the loader may be raised or lowered as desired with reference to the strut 22. Means for maintaining the said parallelogram framework structure rigid for various desired positions or elevations of the strut member 22 will now be described.

An upper pivot block 35 (Fig. 2) provided with a coaxial cylindrical bearing pin 36 (Figs. 4 and 5) at each end of its longitudinal axis and a transverse coaxial cylindrical hole 37 (Fig. 4) extending therethrough, is positioned between bars 13 and 13′ with its bearing pins 36 rotatably fitted in oppositely drilled holes in said bars. This upper pivot block is thereby mounted so as to pivot about a horizontal axis which is at a right angle to the longitudinal axis of the pair of bars 13 and 13′. A lower pivot block 38 (Fig. 2) shaped similarly to upper pivot block 35 except that it is of greater length and the transverse hole therethrough is threaded, is positioned to pivot about a horizontal axis between the vertical flanges of the forwardly extending portions of bent angle bars 12 and 12', the bearing pins of said lower pivot block 38 being rotatably fitted in appropriate holes drilled in anchor pieces 39 which in turn are suitably secured by bolts 40 or other convenient means, to the said vertical flanges of angle bars 12 and 12', the said vertical flanges being appropriately cut away to admit the entrance of the bearing pins of said lower pivot block into the holes of said anchor blocks. The use of said anchor blocks is for convenience of assembling the pivot block 38 in proper relation to said angle bars 12 and 12' since generally said angle bars would be rigidly secured to face plate 10 on the loader prior to the positioning therebetween of said pivot block. The lower pivot block 38 is positioned near the end of the forwardly extending portions of angle bars 12 and 12', and upper pivot block 35 is positioned between bars 13 and 13' preferably farther forward from face plate 10 of the loader than lower pivot block 38, this being for leverage purposes as will be seen later. If desired, the bars 13 and 13' may be held from spreading apart by any suitable means such as a strap of metal, not shown, secured across their edges at an appropriate point near the pivot block 35. A rod 41, having its lower end threaded over a considerable distance, extends through the hole 37 in upper pivot block 35 and is in threaded engagement with lower pivot block 38 through the threaded hole therein, with its threaded end extending through and beyond said lower pivot block. A collar 42, positioned around and welded or otherwise secured to rod 41, rests against the upper face of upper pivot block 35 and collar 43 positioned around rod 41 and secured thereto by means of a set screw, not shown, or in threaded engagement with rod 41, if desired, rests against the lower face of upper pivot block 35. A washer 44 held on the end of rod 41 by key 45 prevents the end of the threaded portion of rod 41 from being turned completely through the pivot block 38. The upper end of rod 41 is bent so that the rod will constitute a hand operated crank by which the said rod 41 can be rotated within pivot blocks 35 and 38. It will thus be seen that as the crank rod 41 is operated it will move axially up and down through pivot block 38, depending on which way it is rotated, but will simply rotate with reference to pivot block 35, collars 42 and 43 preventing axial movement of the rod 41 with reference to pivot block 35. This in turn exerts a lifting, or a lowering, force as the case may be, upon the bars 13 and 13', which force is transmitted to pipe 20 and strut member 22 by reason of their fixed engagement to the parallelogram member 17, as hereinbefore described. Since in the operation of the loader the strut member 22 through its knob 24 is fixed against vertical movement with reference to track members 34 and/or 33 in the truck bed, the operation of the crank rod 41 will raise or lower the forward end of the loader with reference to the truck bed. When the loader is disconnected from a given truck and then connected to another truck having a higher or lower truck bed, the gravity conveyor section of the loader would have a different gradient if the parallelogram frame structure were left in the same position or shape. If the operator should wish to adjust this gradient to accommodate the second truck, he may do so either (a) after connecting the loader to the new truck bed, by turning the crank 41 to raise or lower the end of the loader with reference to the new truck bed, or (b) before connecting the loader to the new truck (and after it is disconnected from the first truck bed), in which event he would turn the crank 41 to raise or lower the outer vertical arm 17 with reference to the end of the loader the strut 22 having been disconnected from the previous truck bed, the said outer arm 17 with its attached strut 22 would obviously be free to be raised or lowered with respect to the loader, whereupon the parallelogram would have been changed so as to give an appropriate gradient for the gravity conveyor section of the loader when the strut member 22 is placed in engagement with the track of the new or second truck bed. Thus the forward end of the loader can be adjusted so as to give the desired gradient to the gravity-conveyor section of the loader for varying heights of different trucks used in the operation. It will also be seen that when the crank of the rod 41 is not being turned or rotated the rod 41, through its collar 42 which rests against pivot block 35 and by reason of its threaded engagement in pivot block 38, will hold rigid the parallelogram frame structure to which the strut 22 is secured and thus maintain the forward end of the loader in fixed elevation with reference to the truck bed 32. The distances of the pivot blocks 35 and 38 from the face plate 10 of the loader, and the distance of the lower pivot block 38 below 35 may be varied as desired in accordance with the leverage that is encountered in raising the forward end of the loader.

As stated hereinabove, the strut member 22 in its latched relationship to the track in the truck bed constitutes the sole connection of the trailing loader to the truck while simultaneously serving also to support the forward portion of the loader for all positions in which the strut member is latched along the length of the truck bed. By reason of the rigidity which can be maintained in the parallelogram frame structure to which the strut member is secured, it will also be seen that during the loading operation and at all times in which the loader is thus hitched to the truck our hitch mechanism permits the loader to trail the truck while the latter is being driven in a curved path over the field.

If desired the functions of the upper and lower pivot blocks 35 and 38 may be reversed. In other words the crank rod 41 may be in threaded engagement with the upper pivot block and anchored in the lower block for rotation only. Another modification may consist in having pivot block 38 in a bracket structure which is secured to the end of the loader in a position above the upper arm (bars 13 and 13') of the parallelogram frame structure in lieu of between the upper and lower arms of the parallelogram. Various other changes may be made in the described and illustrated invention without departing from the spirit thereof as defined in the appended claims.

We claim:

1. An apparatus for hitching to a truck used in gathering boxes of fruit, vegetables and the like from fields where such crops are harvested, a loader which elevates and conveys said boxes to a position over and above the bed of said truck, said apparatus comprising a parallelogram frame structure pivoted at each of its four corners; a first arm of said frame fixedly attached in a vertical position to the delivering end of said loader, the opposite vertical arm thereof being movable up and down with respect to said loader when said loader is disconnected from said truck, and the said first arm together with the end of said loader attached thereto being movable up and down with respect to said truck when said opposite vertical arm is attached to said truck; means attached to said loader for holding said parallelogram frame structure rigid for different positions in the range of upward and downward movements of either of said vertical arms with respect to the other; manually operable means associated with said first mentioned means for changing the said parallelogram frame structure from one such rigid position to another; a vertical strut rigidly secured to said opposite vertical arm and extending downwardly a substantial distance below the lower outer corner of said parallelogram frame structure, the lower end of said strut adapted to bear downwardly upon the bed of said truck; and means for pivotally attaching the said end of said strut to the bed of said truck at any one of a multiplicity of points ranging from the forward to the rearward end of said truck bed, said means constituting, for each said point of attachment, the sole connection of the trailing loader to said truck.

2. The device of claim 1 in which the means for attaching said strut to said truck bed comprises a metal track secured to the truck bed and extending lengthwise thereof, a series of apertures throughout the length of said track, and means for selectively and pivotally latching the end of said strut in any of said apertures in pivotal engagement with said track.

3. The device of claim 2 in which said track comprises a narrow metal plate secured to said truck bed and containing said apertures, a pair of channel bars spaced apart with their channelled faces toward each other and secured edgewise to said plate, the end of said strut formed into a knob adapted to slidably fit between said channel bars with the neck of said knob between the upper adjacent flanges of said channel bars; an axial bore throughout the length of said strut, a rod slidably positioned in said axial bore in said strut adapted to protrude through said knob and to pivotally fit in said apertures of said track to latch said strut to said track, spring means secured to said strut adapted to hold said rod in said aperture, and manually operable means to remove said rod from said aperture.

4. The device of claim 1 in which said means for holding said parallelogram frame structure rigid and the means for moving it from one rigid position to another comprise a rod rotatably mounted to a horizontal arm of said frame and movable about a horizontal axis perpendicular to the longitudinal axis of said arm and secured against axial movement with reference to said arm, a bracket spaced apart from said arm and secured to said loader, a pivot block mounted to said bracket which turns on a horizontal axis parallel to said first mentioned horizontal axis and with which pivot block an axial extension of said rod is in threaded engagement, and means for rotating said rod in said pivot block.

5. The device of claim 1 in which said means for holding said parallelogram frame structure rigid and means for moving it from one rigid position to another comprise a first pivot block mounted on a horizontal arm of said frame to turn about a horizontal axis perpendicular to the longitudinal axis of said arm, a bracket spaced apart from said arm and secured to said loader, a second pivot block mounted on said bracket to turn about a horizontal axis parallel to the pivotal axis of said first pivot block, a bore through each of said pivot blocks at right angles to their pivotal axes, the said bore of one such pivot block being threaded, a rod extending through the bores of both pivot blocks in threaded engagement with the block having the threaded bore and rotatably fitted in the bore of said other pivot block, means for holding said rod against axial movement of said latter pivot block as said rod is turned in said threaded bore, and means for turning said rod in said threaded bore.

6. The device of claim 1 in which said means for holding said parallelogram frame structure rigid and the means for moving it from one rigid position to another comprise a rod swivelably mounted to one of the horizontal arms of said parallelogram frame structure to rotate about its longitudinal axis but secured against axial movement with respect to said arm, said rod when thus mounted being in a vertical plane which is parallel to the longitudinal axis of said arm, said swivelable mounting means being adapted to pivot about a horizontal axis perpendicular to said plane, an end of said rod extending axially beyond said swivelable mounting means and being in threaded engagement in pivotal mounting means secured to the end of said loader and adapted to pivot about an axis parallel to the pivotal axis of said swivelable mounting means, and a portion of said rod being formed into a crank for rotating said rod in said swivelable mounting means.

No references cited.